United States Patent
Jorgovanovic

(10) Patent No.: US 9,838,976 B1
(45) Date of Patent: Dec. 5, 2017

(54) SYSTEM FOR CONTROLLING INTERFERENCE ASSOCIATED WITH WIRELESS COMMUNICATION

(71) Applicant: AMAZON TECHNOLOGIES, INC., Seattle, WA (US)

(72) Inventor: Milos Jorgovanovic, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/414,428

(22) Filed: Jan. 24, 2017

Related U.S. Application Data

(63) Continuation-in-part of application No. 15/265,746, filed on Sep. 14, 2016.

(51) Int. Cl.
| | |
|---|---|
| *H04W 88/06* | (2009.01) |
| *H04W 52/24* | (2009.01) |
| *H04B 15/00* | (2006.01) |
| *H04W 4/00* | (2009.01) |
| *H04W 52/36* | (2009.01) |
| *H04W 84/12* | (2009.01) |
| *H04W 76/02* | (2009.01) |

(52) U.S. Cl.
CPC .......... *H04W 52/243* (2013.01); *H04B 15/00* (2013.01); *H04W 4/008* (2013.01); *H04W 52/241* (2013.01); *H04W 52/245* (2013.01); *H04W 52/367* (2013.01); *H04W 76/023* (2013.01); *H04W 84/12* (2013.01)

(58) Field of Classification Search
CPC ............... H04W 88/06; H04W 52/243; H04W 72/1215; H04W 4/008; H04W 52/241; H04W 52/367; H04W 84/12
USPC .......... 455/522, 69, 68, 127.1–127.3, 168.1, 455/552.1, 73, 562.1, 422.1, 403, 1, 500, 455/517, 553.1, 67.11, 550.1, 575.7; 370/310, 329, 328, 338, 252; 343/702, 343/853, 893
See application file for complete search history.

(56) References Cited

U.S. PATENT DOCUMENTS

2009/0323652 A1* 12/2009 Chen ...................... H04B 1/406
370/338
2013/0329821 A1 12/2013 Chen et al.

OTHER PUBLICATIONS

Ferguson, Keith, "Notice of Allowance dated May 24, 2017", U.S. Appl. No. 15/265,746, The United States Patent and Trademark Office, May 24, 2017.

\* cited by examiner

*Primary Examiner* — Keith Ferguson
(74) *Attorney, Agent, or Firm* — Lindauer Law, PLLC

(57) ABSTRACT

Interference caused by a first wireless radio on other wireless radios may be mitigated by reducing the transmission power of the first wireless radio. The amount by which the transmission power is reduced may differ for each antenna of the first wireless radio and each communication link used by the first wireless radio. Isolation values associated with each antenna of the first wireless radio may be used to determine a target change in transmission power for each antenna that would mitigate interference with the other radio(s). Signal strength data associated with each communication link used by the first wireless radio may be used to determine a maximum change in transmission power for each communication link that would not degrade communications using the link below a threshold level of quality. The transmission power of the first wireless radio may be reduced by the lesser of the target amount or maximum amount.

20 Claims, 6 Drawing Sheets

SYSTEM FOR CONTROLLING INTERFERENCE ASSOCIATED WITH WIRELESS COMMUNICATION

CROSS-REFERENCE TO RELATED APPLICATIONS

This application is a continuation-in part of and claims priority to the United States application for patent entitled "System for Simultaneous Wireless Communication", having the application Ser. No. 15/265,746, filed Sep. 14, 2016. The U.S. patent application Ser. No. 15/265,746 is incorporated by reference herein in its entirety.

BACKGROUND

Some devices include multiple wireless radios, such as devices configured to use both Wi-Fi® and Bluetooth® protocols. These devices may be operated simultaneously.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
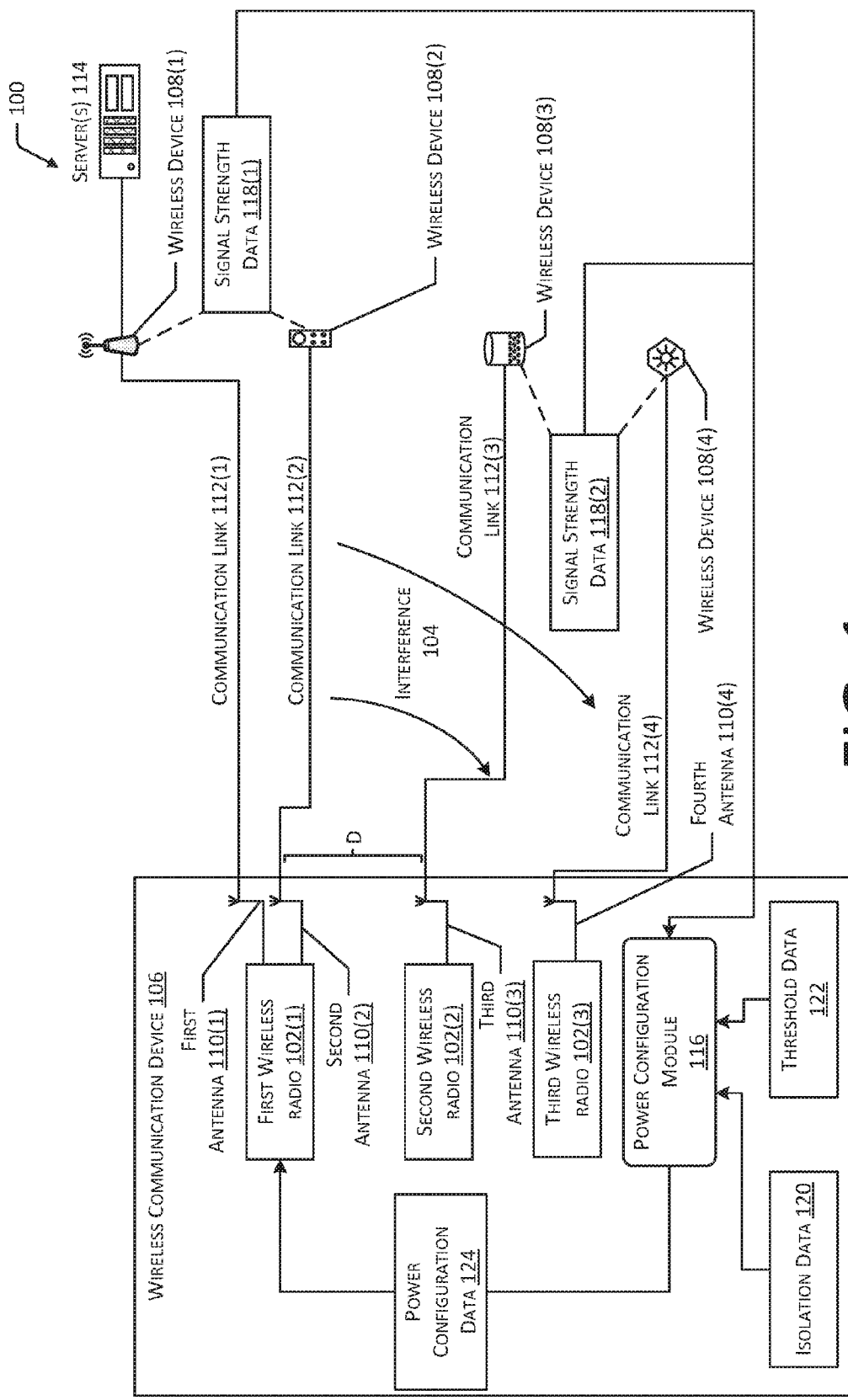
FIG. 1 depicts an implementation of a system for configuring the transmission power of a first wireless radio to at least partially reduce interference from the first wireless radio on communications using other wireless radios.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Some wireless communication devices may include multiple wireless radios, each radio having a respective transmitter, receiver, radio frequency chain, and one or more antennae. For example, a device may include a first wireless radio that communicates using Wi-Fi® and Wi-Fi® Direct protocols and a second wireless radio that communicates using Bluetooth® and Bluetooth® Low Energy protocols. Devices that include multiple wireless radios may experience degradation in quality and signal strength when the radios are used simultaneously, such as when performing full duplex communication. For example, when a first wireless radio transmits a signal, this transmission may interfere with the ability of the second wireless radio to send or receive signals to or from other devices. Similarly, when another wireless radio transmits a signal, the transmission may interfere with communications using the first wireless radio. Typically, interference between multiple wireless radios may be mitigated by isolating the respective antennae used by each radio by a physical distance sufficient to at least partially prevent the interference. However, when the radios are housed within a single device, it may not be possible to separate the antennae by a distance sufficient to prevent the transmissions of one radio from interfering with another radio. As a result, many devices that include multiple wireless radios will not be configured to operate different radios simultaneously and will instead operate the radios via time division duplex communication.

Described in this disclosure are techniques for facilitating simultaneous (e.g., full duplex) operation of multiple wireless radios by reducing the interference to communications using a first wireless radio, and in some cases multiple wireless radios, caused by operation of a second wireless radio. In some implementations, a reduction in interference may be achieved by reducing the transmission power of the second wireless radio to a level that will at least partially eliminate the interference.

For example, a first wireless radio may communicate using one or more Bluetooth® protocols, which may also include, without limitation, communication using a Bluetooth® Low Energy protocol. A Bluetooth® protocol may include a protocol compliant with at least a portion of one or more of Institute of Electrical and Electronics Engineers (IEEE) specification 802.15.1 or a standard promulgated by the Bluetooth Special Interest Group. A second wireless radio may communicate using one or more Wi-Fi® protocols, which may also include, without limitation, communication using a Wi-Fi® Direct protocol. A Wi-Fi® protocol may include a protocol compliant with at least a portion of Institute of Electrical and Electronics Engineers IEEE specification 802.11. Continuing the example, the first wireless radio may communicate with one or more devices within an environment using one or more Bluetooth® communication links. The second wireless radio may communicate with an access point and one or more other devices within the same environment or remote from the environment using a Wi-Fi® protocol or a Wi-Fi® Direct protocol. In some cases, the second wireless radio may use multiple antennae to communicate using the Wi-Fi® and Wi-Fi® Direct protocols. In other examples, a device may include more than two wireless radios. For example, the device may communicate using Bluetooth® protocols with a first wireless radio, Wi-Fi® protocols using a second wireless radio, and ZigBee® protocols using a third wireless radio. Devices may include any number of wireless radios configured to use any combination of communication techniques and protocols.

Due to a close spatial proximity between the antenna(e) associated with the first, second, and third wireless radios, insufficient physical isolation may be present to prevent transmissions using the second wireless radio from interfering with communication using the first and third wireless radios. However, in some cases, a wireless radio using a Wi-Fi® protocol may be sufficiently close to an access point or other device in communication with the wireless radio that the transmission power of the wireless radio may be reduced without reducing the quality or signal strength of the Wi-Fi® communications below a threshold level of quality. Therefore, in such cases, reduction of the transmission power of the second wireless radio may reduce the interference caused by the second wireless radio on communications using the first and third wireless radios without reducing the quality or signal strength of communications using the second wireless radio below the threshold quality.

To reduce or eliminate interference from the second wireless radio on communications using the other wireless radios, a target transmission power for each antenna of the second wireless radio that would at least partially mitigate the interference may be determined. The target transmission power values may be based on characteristics of the antennae or the second wireless radio and the signal strengths of communications using the other wireless radios. A maximum change in the signal strength for the second wireless radio may also be determined, the maximum change representing the amount by which the signal strength may be reduced, such as by reducing the transmission power, without reducing the quality of communications using the second wireless radio below a threshold quality. The maximum change in the signal strength for the second wireless radio may differ for each communication link maintained by the second wireless radio and based on the type or quantity of data transmitted by the second wireless radio. For example, a Wi-Fi® radio may be positioned a significant distance from an access point, but closer to a remote controller that communicates with the device via a Wi-Fi® Direct protocol. In such cases, the transmission power of the Wi-Fi® radio may be reduced by a greater amount when communicating with the remote controller than when communicating with the access point. As another example, the transmission power of a Wi-Fi® radio may be reduced by a greater amount when communicating text, status indicators, or control commands, than when communicating video data. If the target transmission power may be achieved without exceeding the maximum change in signal strength for the second wireless radio, the transmission power of the second wireless radio may be reduced to the target transmission power to mitigate interference on the other wireless radios. If the reduction to the target transmission power would exceed the maximum change in signal strength, the transmission power may be reduced by an amount corresponding to the maximum change to at least partially reduce the interference to the other wireless radios.

To determine a target transmission power for the second wireless radio that would at least partially eliminate interference with the other wireless radios, isolation values for each antenna used by the second wireless radio may be determined. The isolation value for an antenna may represent a target effective isolation between the particular antenna and an antenna of another wireless radio that would reduce or eliminate interference. In cases where the wireless radios may not be physically spaced a sufficient distance to provide this isolation, reduction of the transmission power of the second wireless radio may increase the effective isolation between the antennae. In some implementations, each antenna of the second wireless radio may have a specified isolation value, depending on the configuration, radiation pattern, or other characteristics of the antenna. As such, an isolation value for an antenna may be stored as isolation data and accessed during a process to determine the target transmission power. In cases where the second wireless radio uses multiple antennae, each antenna having a respective isolation value, a respective target transmission power may be determined for each antenna. For example, the transmission power of a wireless radio may be reduced by a first amount when transmitting using a first antenna, but a second, larger amount when transmitting using a second antenna. Additionally, when a device includes more than two wireless radios, each antenna of the second wireless radio may include a different isolation value for each of the other wireless radios within the device. For example, based on the characteristics of the antennae and the physical distance between them, an antenna of a Wi-Fi® radio may have a first isolation value associated with interference on a Bluetooth® radio and a second isolation value associated with interference on a ZigBee® radio.

In addition to the respective isolation values of the antennae for the second wireless radio, the signal strength for each communication link associated with the first and third wireless radios may be determined. For example, the first wireless radio may communicate with one or multiple devices using Bluetooth® or Bluetooth® Low Energy protocols, and signals received from each device may correspond to respective received signal strength indicator (RSSI) or another indication of signal strength or quality, such as a received channel power indicator (RCPI). The third wireless radio may communicate with one or more other devices using a ZigBee® protocol, and signals received from each device may be associated with respective RSSI, RCPI, or other indications of signal strength or quality. In some implementations, the RSSI, RCPI, or other signal strength values associated with the wireless radios may include average values. For example, a signal strength value may include a moving average determined by calculating the mean, mode, or median value associated with a fixed count of previous of signals strength measurements, such as the previous ten RSSI values determined for the first wireless radio. In cases where the first wireless radio or the third wireless radio communicates with multiple devices, each communication link having a respective signal strength, a signal strength value for each communication link may be determined. To determine the target transmission power for the second wireless radio, a lowest signal strength value for each of the other wireless radios may be determined. For example, the minimum signal strength value, selected from the group of signal strength values determined for each communication link for the first wireless radio may be determined. Similarly, the minimum signal strength value for the third wireless radio may also be determined.

Based on the lowest signal strength value for the first and third wireless radios, a maximum interference value associated with the second wireless radio may be determined. The maximum interference value may represent the greatest signal strength of the second wireless radio that may be achieved without generating interference in excess of a threshold interference level that affects communications using the other wireless radios. Typically, the relationship between the signal strength values associated with the other wireless radios and the maximum interference value for the second wireless radio varies based on a non-linear function in which the maximum interference value increases as the signal strength values for the other wireless radios increase. In some implementations, one or more look up tables, databases, or other types of data structures may store signal strength values for the first wireless radio and the third wireless radio in association with corresponding maximum interference values for the second wireless radio.

Based on the minimum isolation value for each antenna used by the second wireless radio and the maximum interference values for the second radio, determined based on the minimum signal strength for each communication link of the first and third wireless radios, target maximum transmission power values for each antenna of the second wireless radio that would at least partially mitigate interference with each of the other wireless radios may be determined, as illustrated in Equation 1:

$$MTPar = IVa + MIVr - \text{Offset} \qquad \text{(Equation 1)}$$

In Equation 1, MTPar represents the target maximum transmission power of the second wireless radio using a particular antenna ("a"), that would at least partially mitigate interference with communications by a particular wireless radio ("r"). IVa represents the isolation value of the particular antenna. MIVr represents the maximum interference value associated with the effect of communications by the second wireless radio on the particular wireless radio. As described previously, the maximum interference value may be determined using a look up table or other data structure that associates maximum interference values with respective values for the signal strength of the other wireless radio. In cases where the other wireless radio communicates with multiple devices via multiple communication links, the communication link having the lowest signal strength may be used to determine the corresponding maximum interference value. The Offset value in Equation 1 may include any constant, such as 5 decibels (dB), that may be used to accommodate the peak to average power ratio (PAPR) or other fluctuations in signal strength that may occur when using the second wireless radio. Therefore, an independent maximum transmission power value may be determined for each antenna of the second wireless radio and each other wireless radio within the device. For example, if a device includes a Wi-Fi® radio having two antennae (e.g., A1, A2), and two additional wireless radios (e.g., R1, R2) other than the Wi-Fi® radio, maximum transmission power values may be determined for each combination of antennae and wireless radios (e.g., A1/R1, A2/R1, A1/R2, A2/R2). In some implementations, a single maximum transmission power value for each antenna of the second wireless radio may be determined by selecting the minimum value from among the maximum transmission power values of that antenna determined for each of the other wireless radios. For example, if the MTPar value for a first antenna and a first affected wireless radio is less than the MTPar value for the first antenna and a second wireless radio, a single MTP value for the first antenna may be determined by selecting the MTPar value for the first affected wireless radio.

To determine whether the current transmission power for the second wireless radio may be reduced to the target transmission power without impacting the quality of communications using the second wireless radio, a maximum change in the signal strength associated with the second wireless radio may be determined. To determine the maximum change in signal strength, the RSSI, RCPI, or other signal strength value associated with communications using the second wireless radio may be determined. The maximum change in signal strength for the second wireless radio may differ for each communication link maintained by the second wireless radio. For example, communication between the second wireless radio and a device that is very close to the second wireless radio may be supported even if the transmission power of the second wireless radio is significantly reduced, while communication between the second wireless radio and a device that is significantly farther may fail if the transmission power of the second wireless radio is reduced. In some implementations, the signal strength values for the second wireless radio may include average values, such as a moving average determined using a fixed count of previous signal strength measurements. In cases where the second wireless radio communicates with multiple devices, such as multiple access points, a different value may be determined for each communication link maintained by the second wireless radio. A difference between each signal strength value and a minimum threshold signal strength may be used to determine a maximum change in signal strength for each communication link maintained by the second wireless radio. If the RSSI, RCPI, or other signal strength value for a communication link of the second wireless radio falls below the minimum threshold signal strength, the quality of communications using that particular communication link may be negatively affected. In some implementations, the minimum threshold signal strength may include a default value or user input value. In other implementations, the minimum threshold signal strength may vary dynamically based on the content that is communicated using the second wireless radio. For example, communication of audio or video content may be associated with a greater threshold signal strength than the communication of status indications, control commands, or text.

In some implementations, the second wireless radio may communicate with various devices using both Wi-Fi® and Wi-Fi® Direct protocols. In such cases, the RSSI, RCPI, or other signal strength values for the Wi-Fi® communications may differ from those determined for the Wi-Fi® Direct communications. Additionally, the minimum threshold signal strength for the Wi-Fi® communications may differ from those associated with the Wi-Fi® Direct communications. For example, the minimum threshold signal strength for Wi-Fi® Direct communications may be lower than that for Wi-Fi® communications. In cases where multiple protocols are used to communicate with various devices, the difference between the current signal strength and minimum signal strength for each communication link may be determined.

The maximum change in signal strength for the second wireless radio may therefore be determined based at least in part on Equation 2:

$$MCSSl = SSVl - TSSV \qquad \text{(Equation 2)}$$

In Equation 2, MCSSl represents the maximum change in signal strength of the second wireless radio for a particular communication link ("l") that may occur without reducing the quality of communications using the communication link below a threshold quality. SSVl and TSSV represent the current signal strength value for the particular communication link and minimum threshold signal strength value, respectively, for communications using the second wireless radio. In cases where the second wireless radio communicates with multiple devices, such as multiple access points, a respective maximum change in signal strength may be determined for each communication link. In cases where the second wireless radio communicates with various devices using multiple protocols, communicates different types of data, or communicates data using different data throughput rates, each protocol, type of content, or data throughput rate may have a respective minimum threshold signal strength. In such cases, SSVi and TSSV may include the corresponding values determined to have the smallest difference between them.

Based on the current transmission power for the second wireless radio and the maximum transmission power for the second wireless radio, which may be determined based on Equation 1, the target change in the transmission power of the second wireless radio may be determined based on Equation 3:

$$TCTPar = TP - MTPar \quad \text{(Equation 3)}$$

In Equation 3, TCTPar represents the target change in transmission power for a particular antenna ("a") to reduce interference on a particular other wireless radio ("r"). TP represents the current signal transmission power of the second wireless radio, and MTPar represents the maximum transmission power for the particular antenna and other wireless radio, determined using Equation 1. Therefore, a target change in transmission power may be determined for each combination of antenna and affected wireless radio. For example, if a device includes a Wi-Fi® radio having two antennae (e.g., A1, A2), and two additional wireless radios (e.g., R1, R2) other than the Wi-Fi® radio, target changes in transmission power may be determined for each combination of antennae and wireless radios (e.g., A1/R1, A2/R1, A1/R2, A2/R2). In some implementations, a single target change in transmission power may be determined for each antenna of the second wireless radio by selecting the largest value from among the target change in transmission power values determined for that antenna. For example, if the transmission power for a particular antenna may be decreased by a first amount to mitigate interference on a first wireless radio, and by a second larger amount to mitigate interference on a second wireless radio, the target change in transmission power for the particular antenna may correspond to the second larger amount.

If a target change in transmission power for a particular antenna is less than the maximum change in signal strength for a particular communication link, the transmission power of the second wireless radio may be reduced by a value corresponding to the target change. Reduction of the transmission power in this manner may reduce interference of the particular antenna on the other wireless radios, without reducing the quality of communications of the second wireless radio, when using the particular communication link, below a threshold quality. However, if a target change value exceeds a maximum change value, then reducing the transmission power by a value corresponding to the target change may negatively impact the quality of communications using the particular communication link of the second wireless radio. In some implementations, a user setting or preference may indicate that the quality of communications using the second wireless radio may be compromised in favor of avoiding interference with one or more other wireless radios, and the transmission power of the second wireless radio may be reduced by an amount corresponding to the target change. In other implementations, the transmission power of the second wireless radio may instead be reduced by an amount corresponding to the maximum change, which may at least partially reduce interference to the other wireless radios while maintaining the quality of communications using the second wireless radio.

In some cases, the maximum change in signal strength may be less than zero. For example, based on the content currently transmitted using the second wireless radio, the minimum threshold signal strength may exceed the current signal strength for communications associated with the second wireless radio. In some implementations, when the maximum change is less than zero, the transmission power of the second wireless radio may not be reduced, independent of the value of the target change in transmission power. In other implementations, the transmission power of the second wireless radio may be increased, rather than decreased, by a value corresponding to at least a portion of the maximum change. For example, a default configuration or user setting may indicate that improving the quality of communications using the second wireless radio is to be prioritized over avoiding interference to the first or third wireless radios. In still other implementations, in cases where the maximum change is less than zero, operation of the wireless radios may be switched from simultaneous communication to alternate communication (e.g., time division duplex).

FIG. 1 depicts an implementation of a system 100 for configuring the transmission power of a first wireless radio 102(1) to at least partially reduce interference 104 from the first wireless radio 102(1) on communications using one or more of a second wireless radio 102(2) or a third wireless radio 102(3). For example, a wireless communication device 106 may include a first wireless radio 102(1), a second wireless radio 102(2), and a third wireless radio 102(3), each of which may be used to communicate with various wireless devices 108. The wireless communication device 106 may include any type of computing device including, without limitation, a laptop computer or other personal computer, a smartphone, tablet computer, wearable computer, or other portable or mobile device, an automotive computer, a set-top box, a server, an audio or video output device, a remote control or game controller, an access point, and so forth. The wireless devices 108 may include, without limitation, any of the types of computing devices described with regard to the wireless communication device 106, or other types of devices.

Continuing the example, the first wireless radio 102(1) may communicate using a first protocol, such as Wi-Fi®, the second wireless radio 102(2) may communicate using a second protocol, such as Bluetooth®, and the third wireless radio 102(3) may communicate using a third protocol, such as ZigBee®. The first wireless radio 102(1), second wireless radio 102(2), and third wireless radio 102(3) may each use one or more antennae 110 to transmit data. For example, the first wireless radio 102(1) may be associated with a first antenna 110(1) and a second antenna 110(2). The antennae 110 of the first wireless radio 102(1) may be used to transmit signals via a first communication link 112(1), using a Wi-Fi® protocol, to a first wireless device 108(1), which may include an access point. Communications transmitted to and received from the access point may be used to communicate with one or more devices remote from the wireless communication device 106, such as one or more servers 114. The first wireless radio 102(1) may also transmit signals via a second communication link 112(2), using a Wi-Fi® Direct protocol, to the second wireless device 108(2), which may include a remote control device or other device proximate to the wireless communication device 106. In some cases, the first wireless radio 102(1) may communicate with the first wireless device 108(1) and the second wireless device 108(2) using time-division-duplex communication. The second wireless radio 102(2) may be associated with a third antenna 110(3), which may transmit signals via a third communication link 112(3), using a Bluetooth® protocol, to a third wireless device 108(3), which may include an audio output device such as a speaker. The third wireless radio 102(3) may be associated with a fourth antenna 110(4), which may transmit signals via a fourth communication link 112(4), using a ZigBee® protocol, to a fourth wireless device 108(4), which may include a controllable light source. While FIG. 1 depicts an example system 100 in which the first wireless radio 102(1) uses two antennae 110 and the second wireless radio 102(2) and third wireless radio 102(3) each use a single antenna 110, other implementations may include any number of wireless radios 102 and any number of antennae 110 associated with a particular wireless radio 102. Additionally, while FIG. 1 depicts the first wireless radio 102(1) communicating with two wireless devices 108 and the second wireless radio 102(2) and third wireless radio 102(3) each communicating with a single wireless device 108, in other implementations, a wireless radio 102 may transmit signals to multiple wireless devices 108, such as via time-division duplex communication.

Operation of the first wireless radio 102(1) may generate interference 104 that reduces the signal strength or quality of communications using the second wireless radio 102(2) or third wireless radio 102(3). For example, when the first wireless radio 102(1) is used to transmit signals to one or more wireless devices 108, these signals may be detectable by the second wireless radio 102(2), and the noise associated with the signals may reduce the ability of the second wireless radio 102(2) to receive signals from wireless devices 108. Use of the first wireless radio 102(1) may similarly interfere with communications using the third wireless radio 102(3). Each antenna 110 used by the first wireless radio 102(1) may be spaced from each antenna 110 used by the second wireless radio 102(2) and the third wireless radio 102(3) by a distance (D), which may provide some physical isolation between the antennae 110 and reduce the interference 104. However, due to physical constraints, such as the size of the housing of the wireless communication device 106, it may not be possible to space the antennae 110 a sufficient distance to mitigate the interference 104. Reduction in the transmission power associated with the antennae 110 of the first wireless radio 102(1) may reduce the strength of the signals transmitted by the antennae 110, which may further reduce the interference 104 on communications using the second wireless radio 102(2) and third wireless radio 102(3).

A power configuration module 116 associated with the wireless communication device 106 may modify the transmission power of the first wireless radio 102(1) based in part on signal strength data 118 associated with each communication link 112. For example, first signal strength data 118(1) may include a RSSI, RCPI, or other indication of signal strength determined based on communications between the first wireless radio 102(1) and one or more of the first wireless device 108(1) or the second wireless device 108(2). For example the first signal strength data 118(1) may include a first signal strength value (e.g., an average signal strength value), measured by the wireless communication device 106, that indicates the signal strength of communications received from the first wireless device 108(1), and a second signal strength value associated with communications received from the second wireless device 108(2). Second signal strength data 118(2) may include a RSSI, RCPI, or other indication of signal strength, measured by the wireless communication device 106, that indicates the signal strength of communications received by the second wireless radio 102(2) from the third wireless device 108(3) and by the third wireless radio 102(3) from the fourth wireless device 108(4).

Based on the signal strength data 118(2) associated with the second wireless radio 102(2) and third wireless radio 102(3), the power configuration module 116 may determine one or more maximum interference values associated with the first wireless radio 102(1). Each maximum interference value may be associated with a particular one of the other wireless radios 102. For example, a first maximum interference value may represent a maximum signal strength associated with communications with the first wireless radio 102(1) that may be achieved without generating interference 104, greater than a threshold quantity of interference, that affects communications using the second wireless radio 102(2). A second maximum interference value may be associated with use first wireless radio 102(1) that may avoid generating interference 104 greater than the threshold quantity on communications using the third wireless radio 102(3). In some implementations, the maximum interference values may be determined by accessing a look up table, database, or other data structure that associates values of signal strength data 118(2) for the second wireless radio 102(2) and third wireless radio 102(3) with corresponding maximum interference values. The power configuration module 116 may also access isolation data 120, indicative of one or more isolation values corresponding to one or more of the wireless radios 102 or to the antennae 110 associated therewith. As discussed previously, the isolation values and the maximum interference values may be used to determine a target maximum transmission power associated with each antenna 110 of the first wireless radio 102(1) that may mitigate interference 104 on communications using the second wireless radio 102(2) and the third wireless radio 102(3). For example, the maximum transmission power values may be determined based at least in part on Equation 1, above.

A target change in the transmission power of each antenna 110 of the first wireless radio 102(1) and a maximum change in the signal strength of each communication link 112 maintained by the first wireless radio 102(1) may be determined based on the first signal strength data 118(1), associated with communications using the first wireless radio 102(1), and the current transmission power of the first wireless radio 102(1). For example, a respective maximum change in signal strength may be determined for each communication link 112 used by the first wireless radio 102(1). The respective values indicative of a maximum change in signal strength for the first wireless radio 102(1) when using the first communication link 112(1) and the second communication link 112(2) may be determined based on the first signal strength data 118(1) and threshold data 122, as indicated in Equation 2, above. Threshold data 122 may include minimum signal strength values associated with communication using the first wireless radio 102(1) or one or more of the first antenna 110(1) or the second antenna 110(2) that will not reduce the quality of communications using the first wireless radio 102(1) below a threshold quality. In some implementations, the threshold data 122 may include multiple threshold values that correspond to different types of content that may be communicated using the first wireless radio 102(1). For example, communication of data to a server 114 using a Wi-Fi® protocol may have a greater minimum threshold signal strength than communication of data to a remote control using a Wi-Fi® Direct protocol. As another example, the type of modulation used when transmitting data packets may affect the minimum threshold signal strength. The target change in transmission power may be determined based on the current transmission power of the first wireless radio 102(1) and the maximum transmission power, as indicated in Equation 3, above.

Based at least in part on the target change in transmission power and the maximum change in signal strength, the power configuration module 116 may generate power configuration data 124, which may be provided to the first wireless radio 102(1) to cause a change in the transmission power for each antenna 110 thereof. In some cases, the power configuration data 124 may cause the transmission power of the antennae 110 of the first wireless radio 102(1) to be changed by different amounts depending on the communication link 112 currently used by the first wireless radio 102(1). If the target change in transmission power is less than the maximum change in signal strength, the power configuration data 124 may be configured to cause the first wireless radio 102(1) to reduce transmission power for each antenna 110 by an amount corresponding to the target change values. If the target changes in transmission power would cause the first wireless radio 102(1) to exceed the maximum change in signal strength, the power configuration data 124 may be configured to cause the first wireless radio 102(1) to reduce the transmission power of the antennae 110 by an amount corresponding to the maximum change. If the maximum change is less than or equal to zero, the power configuration data 124 may be configured to maintain the current transmission power for the first wireless radio 102 (1), or in other implementations, the power configuration module 116 may not generate power configuration data 124. In still other implementations, if the maximum change is less than or equal to zero the power configuration data 124 may be configured to increase the current transmission power of one or more antennae 110 of the first wireless radio 102(1) or to cease simultaneous operation of the wireless radios 102 (e.g., full duplex communication) and begin alternate operation of the wireless radios 102 (e.g., time division duplex communication).

While FIG. 1 depicts the power configuration module 116 associated with the wireless device 106, in other implementations, one or more functions described with regard to the power configuration module 116 may be performed by other devices in communication with the wireless communication device 106. For example, any combination of the wireless communication device 106, one or more of the wireless devices 108, the server(s) 114, or any other computing device(s) in communication with the wireless communication device 106 may be used to perform any of the functions described with regard to the power configuration module 116.

While FIG. 1 illustrates a scenario in which the first wireless radio 102(1) generates interference 104 that affects communications using the second wireless radio 102(2) and third wireless radio 102(3), in other cases, the transmission of signals by one or more of the second wireless radio 102(2) or the third wireless radio 102(3) may similarly generate interference 104 on communications using the other wireless radios 102. Additionally, in some cases, the simultaneous transmission of signals using two of the wireless radios 102 may generate interference on communications using the remaining one of the wireless radios 102. In each case, the process described previously may be performed for each transmitting wireless radio 102 to reduce the interference 104 caused to the other wireless radios 102.

Figure 2:
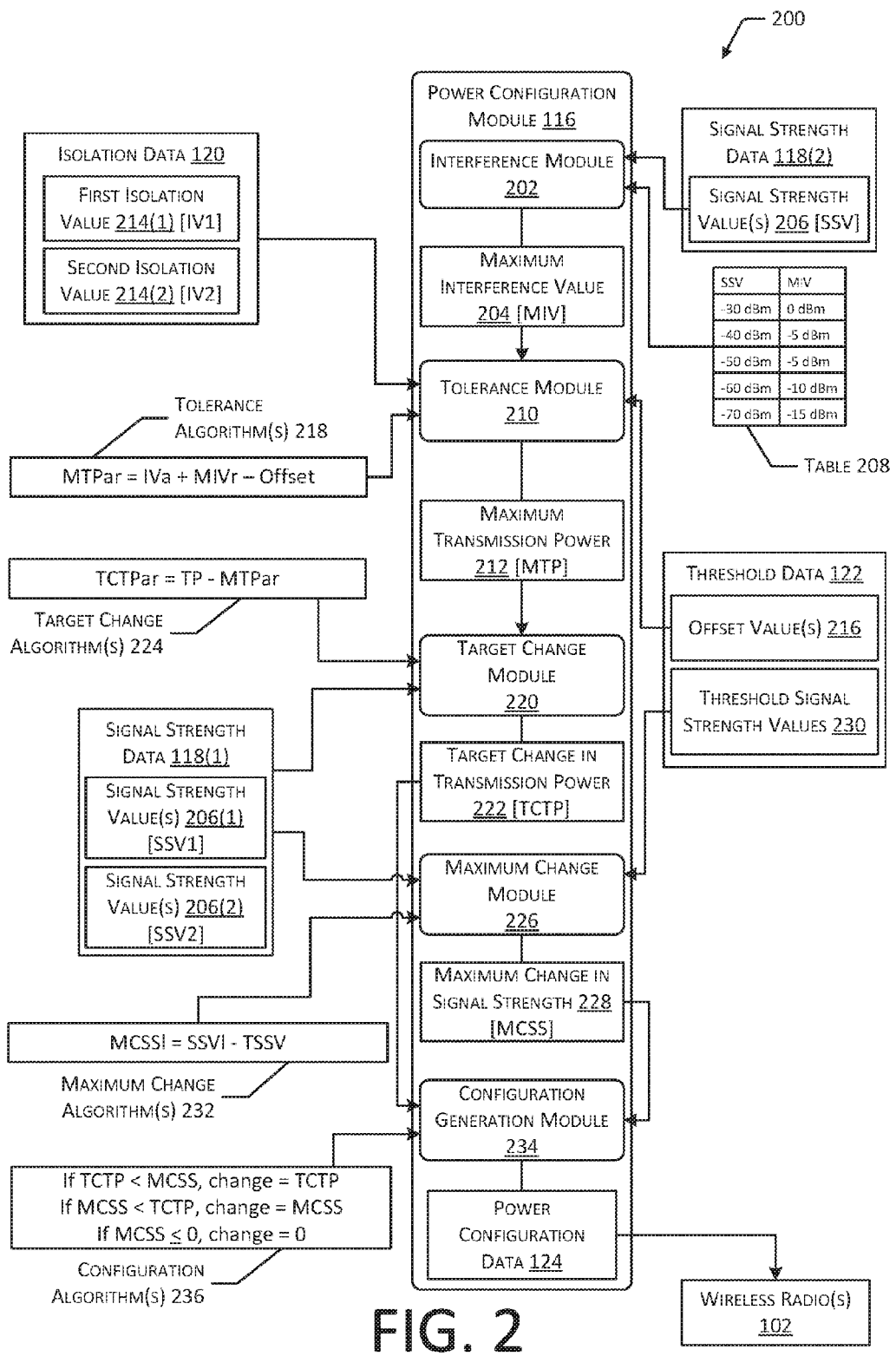
FIG. 2 is a block diagram depicting generation of power configuration data based on signal strength data determined from communications between wireless radios and wireless devices.

FIG. 2 is a block diagram 200 depicting generation of power configuration data 124 based on signal strength data 118 determined from communications between wireless radios 102 and wireless devices 108. As described with regard to FIG. 1, a power configuration module 116 associated with the wireless communication device 106, or one or more computing devices in communication with the wireless communication device 106, may be used to determine the manner in which the transmission power of the antennae 110 of a first wireless radio 102(1) may be modified to reduce interference 104 on communications using a second wireless radio 102(2) and a third wireless radio 102(3). For example, FIG. 2 depicts an interference module 202 associated with the power configuration module 116. The interference module 202 may determine one or more maximum interference values 204 associated with the first wireless radio 102(1). The maximum interference values 204 may represent a maximum signal strengths that may be achieved by the first wireless radio 102(1) without generating interference 104, in excess of a threshold quantity, on communications using the second wireless radio 102(2) or the third wireless radio 102(3). The maximum interference value 204 may be determined based at least in part on the signal strength data 118(2) determined from communications received by the second wireless radio 102(2) and the third wireless radio 102(3). For example, the signal strength data 118(2) may include one or more signal strength values 206, such as RSSI or RCPI values, associated with communications received by the second wireless radio 102(2) and third wireless radio 102(3). In one implementation, the interference module 202 may access a table 208 or other data structure that associates signal strength values 206 with corresponding values for the maximum interference value 204. In some cases, different tables 208 may be associated with the second wireless radio 102(2) and the third wireless radio 102(3). In other cases, a single table 208 may associate signal strength values 206 for both the second wireless radio 102(2) and third wireless radio 102(3) with corresponding maximum interference values. In cases where the second wireless radio 102(2) communicates with multiple wireless devices 108 via multiple communication links 112, the signal strength data 118(2) may include multiple signal strength values 206 for the second wireless radio 102(2). In such cases, the interference module 202 may determine the maximum interference value 204 that corresponds to the smallest signal strength value 206 associated with the second wireless radio 102(2). Similarly, if the third wireless radio 102(3) communicates with multiple wireless devices 108, the interference module 202 may determine a maximum interference value 204 that corresponds to the smallest signal strength value 206 associated with the third wireless radio 102(3).

A tolerance module 210 associated with the power configuration module 116 may determine one or more values for the maximum transmission power 212 for each antenna 110 of the first wireless radio 102(1) that would avoid generating interference 104 in excess of a threshold quantity with regard to communications using the second wireless radio 102(2) or the third wireless radio 102(3). In some implementations, the maximum transmission power 212 values may be determined using Equation 1, above. The tolerance module 210 may access isolation data 120, which may include one or more isolation values 214 associated with each antenna 110 used by the first wireless radio 102(1). For example, the isolation data 120 may include a first isolation value 214(1) associated with the first antenna 110(1) and a second isolation value 214(2) associated with the second antenna 110(2). In some implementations, the isolation values 214 for particular antennae 110 may include preset or default values based on one or more characteristics of the antennae 110, such as the size, materials, radiation pattern, or configurations thereof. In other implementations, the tolerance module 210 or another module in communication therewith may be configured to measure isolation values 214 for the antennae 110 based on one or more of signal strength values 206, noise, and interference 104 determined using each antenna 110. In some cases, the isolation data 120 may include multiple isolation values 214 for a particular antenna 110 with regard to other wireless radios 102. For example, an antenna 110 may include a first isolation value 214 that corresponds to a target quantity of isolation for reducing interference to a first wireless radio 102 and a second isolation value 214, different from the first, that corresponds to a target quantity of isolation for reducing interference to a second wireless radio 102.

The tolerance module 210 may also access threshold data 122, which may include one or more offset values 216. Offset values 216 may include fixed values (e.g., constants), such as 5 decibels (dB), or another value, that may be used to accommodate for fluctuations in signal strength that may occur when using the first wireless radio 102(1). The tolerance module 210 may also receive one or more maximum interference values 204, determined by the interference module 202. Based on the isolation value(s) 214, the maximum interference value(s) 204, the offset value(s) 216, and one or more tolerance algorithms 218, the tolerance module 210 may determine one or more maximum transmission power 212 values for each antenna 110 of the first wireless radio 102(1). For example, as described in Equation 1, above, the maximum transmission power 212 for a particular antenna 110 of the first wireless radio 102(1), that would mitigate interference with a particular one of the other wires radios 102, may be determined based on the sum of the isolation value 214 for the particular antenna 110 and the maximum interference value 204 for the particular other wireless radio 102, minus an offset value 216. For example, FIG. 2 depicts an example tolerance algorithm 218 as "MTPar=IVa+MIVr−Offset".

A target change module 220 associated with the power configuration module 116 may determine one or more target change in the transmission power 222 values based in part on the maximum transmission power 212 values. A target change in transmission power 222 may represent the amount by which the transmission power of the first wireless radio 102(1) may be decreased to mitigate interference 104 to communications using the second wireless radio 102(2) and the third wireless radio 102(3). As described previously with regard to Equation 3, the target change in transmission power 222 may be determined based on the current transmission power associated with the first wireless radio 102(1) and the maximum transmission power 212 values determined by the tolerance module 210. The target change module 220 may determine the current transmission power based on signal strength data 118(1) or other data indicative of the transmission power, received from the first wireless radio 102(1). In some cases, the signal strength data 118(1) may include multiple signal strength values 206. Based on the current transmission power, the maximum transmission power 212 to avoid interference 104 to a particular wireless radio 102, and one or more target change algorithms 224, the target change module 220 may determine a target change in transmission power 222 that would mitigate interference 104 to the particular wireless radio. For example, FIG. 2 depicts an example target change algorithm 224 as "TCTPar=TP−MTPar". In some implementations, the target change module 220 may determine a single target change in transmission power 222 for each antenna 110 of the first wireless radio 102(1) by selecting the maximum TCTPar from among the values determined for each of the other wireless radios 102.

In other cases, a single target change in transmission power 222 may be determined for each antenna 110 by selecting the smallest maximum transmission power 212 value for a particular antenna 110 from among the maximum transmission power 212 values determined for each of the other wireless radios 102. The smallest maximum transmission power 212 from among the multiple maximum transmission power 212 values may be used to determine the target change in transmission power 222.

A maximum change module 226 associated with the power configuration module 116 may determine a maximum change in signal strength 228 for the first wireless radio 102(1). The maximum change in signal strength 228 may represent an amount by which the signal strength of the first wireless radio 102(1) may be decreased without decreasing the quality of communications using the first wireless radio 102(1) below a threshold quality. As discussed with regard to FIG. 1, in some cases, a different maximum change in signal strength 228 may be determined for each communication link 112 maintained by the first wireless radio 102(1). The maximum change in signal strength 228 may be determined based on the signal strength value(s) 206 associated with the first wireless radio 102(1) and one or more threshold signal strength values 230, as indicated in Equation 2, above. For example, the threshold data 122 may include a first threshold signal strength value 230 associated with communications between the first wireless radio 102(1) and a first wireless device 108(1) using a first protocol, such as Wi-Fi®. The threshold data 122 may also include a second threshold signal strength value 230 associated with communications between the first wireless radio 102(1) and a second wireless device 108(2) using a second protocol, such as Wi-Fi® Direct. In some implementations, the threshold signal strength values 230 may include dynamic values that vary based on the content sent or received using the first wireless radio 102(1) or characteristics of the wireless devices 108 with which the first wireless radio 102(1) communicates. In other implementations, the threshold data 122 may include a table or other data structure that associates particular threshold signal strength values 230 with particular types of content, protocols, data rates, modulations, or wireless devices 108. The threshold signal strength value(s) 230 may indicate a minimum signal strength that prevents the quality of communications using the first wireless radio 102(1) from degrading to a level less than a threshold quality. In some cases, different threshold signal strength values 230 may correspond to different communication links 112 maintained by the first wireless radio 102(1). In other cases, a single threshold signal strength value 230 may be used for multiple communication links 112 maintained by the first wireless radio 102(1). As such, the maximum change in signal strength 228 for a particular communication link 112 may be determined based on the difference between a current signal strength value 206 for the communication link 112 and a corresponding threshold signal strength value 230. For example, FIG. 2 depicts an example maximum change algorithm 232 that may be used to determine the maximum change in signal strength 228 as "MCSSI=SSV|−TSSV".

A configuration generation module 234 associated with the power configuration module 116 may generate power configuration data 124 to modify the transmission power of the antennae 110 of the first wireless radio 102(1) based on the target changes in transmission power 222 for each antenna 110, the maximum change in signal strength 228 for each communication link 112, and one or more configuration algorithms 236. The configuration algorithm(s) 236 may indicate particular operations to be performed based on the relationship between the target change in transmission power 222 and the maximum change in signal strength 228. For example, the configuration algorithms 236 may indicate that if the target change in transmission power 222 for a particular antenna 110 is less than the maximum change in signal strength 228, the transmission power for the particular antenna 110 is to be decreased by an amount equal to the target change in transmission power 222. However, if the maximum change in signal strength 228 is less than the target change in transmission power 222, the transmission power of the particular antenna 110 may be decreased by an amount corresponding to the maximum change in signal strength 228. If the maximum change in signal strength 228 is less than or equal to zero, the transmission power of the particular antenna 110 may remain unchanged. In some implementations, if the maximum change in transmission power 228 is less than zero, the transmission power may be increased by an amount equal to at least a portion of the difference between the maximum change in signal strength 228 and zero. In other implementations, if the maximum change in signal strength 228 is less than or equal to zero, the wireless communication device 106 may switch from use of multiple wireless radios 102 simultaneously to alternate use of the wireless radios 102.

Figure 3:
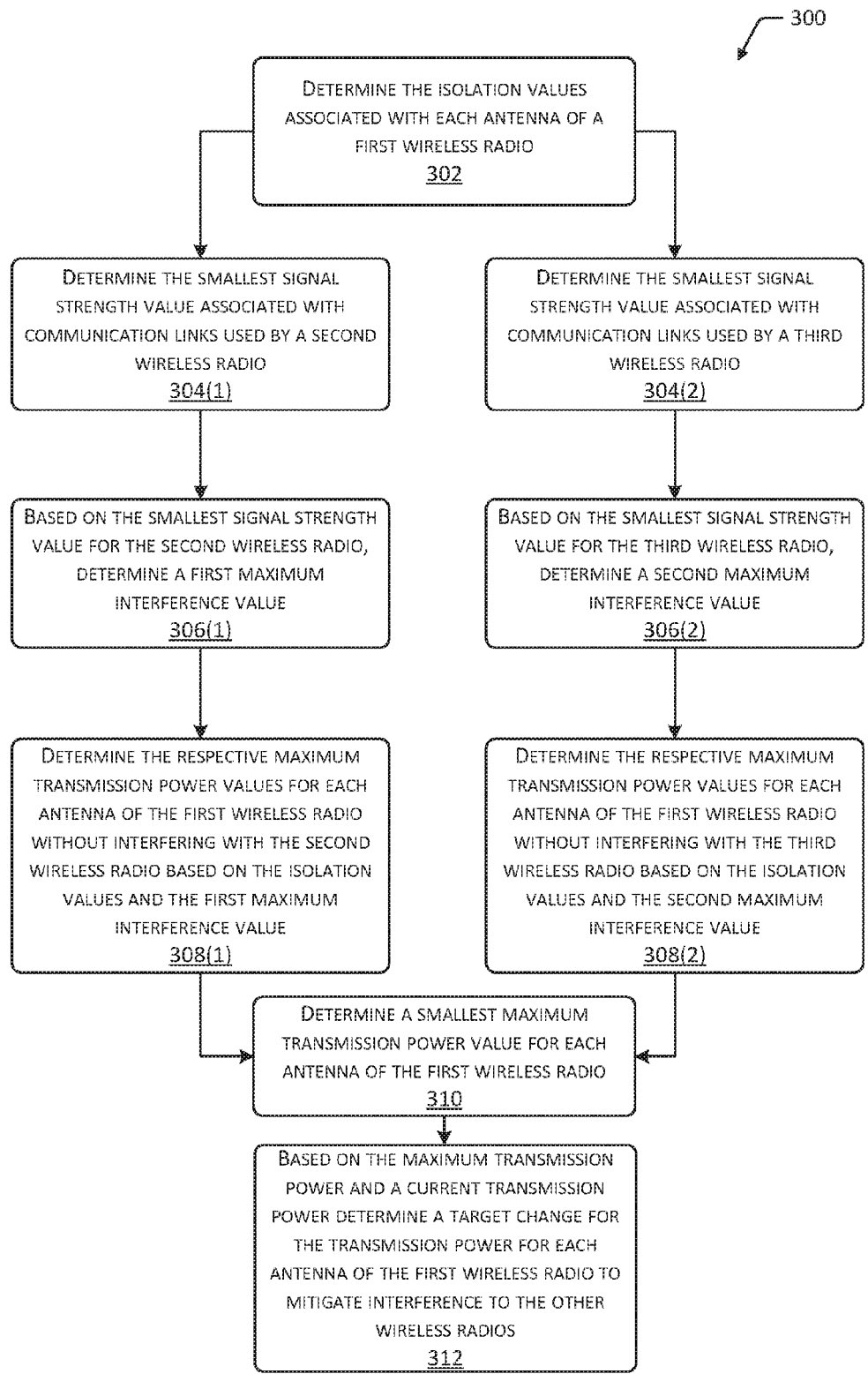
FIG. 3 is a flow diagram illustrating a method for determining a change in transmission power for a first wireless radio that eliminates interference to communications using other wireless radios.

FIG. 3 is a flow diagram 300 illustrating a method for determining a change in transmission power for each antenna 110 of a first wireless radio 102(1) that at least partially reduces interference 104 to communications using a second wireless radio 102(2) and a third wireless radio 102(3). Block 302 determines the isolation values 214 associated with each antenna 110 used by a first wireless radio 102(1). For example, the first wireless radio 102(1) may be associated with multiple antennae 110, each antenna 110 having different characteristics, such as a different size, radiation pattern, and so forth. In some implementations, the antennae 110 used by the first wireless radio 102(1) may communicate with different devices using different protocols. For example, a first antenna 110(1) and a second antenna 110(2) may communicate using a Wi-Fi® or Wi-Fi® Direct protocols. In some implementations, each antenna 110 may include a corresponding isolation value 214, stored as isolation data 120. In other implementations, an isolation value 214 for one or more antennae 110 may be measured based on communications with wireless devices 108 using the antennae 110, interference 104 generated during use of the antennae 110, and so forth.

Block 304(1) determines the smallest signal strength value 206 associated with communication links 112 used by a second wireless radio 102(2). Block 304(2) determines the smallest signal strength value 206 associated with communication links 112 used by a third wireless radio 102(3). For example, the second wireless radio 102(2) may communicate with various wireless devices 108 using one or more protocols, such as Bluetooth® or Bluetooth® Low Energy. Each communication may have an associated RSSI, RCPI, or other signal strength value 206. The signal strength value 206 associated with a particular communication link 112 may include an average value determined for a period of time or based on a fixed count of previous signal strength measurements. In cases where the second wireless radio 102(2) communicates with only a single wireless device 108, the signal strength value 206 for that communication link 112 may be used, and block 304(1) may be omitted. Similarly, the third wireless radio 102(3) may communicate with multiple wireless devices 108 or with a single wireless device 108, and Block 304(2) may determine the smallest signal strength value 206 associated with the third wireless radio 102(3).

Block 306(1) determines, based on the smallest signal strength value 206 for the second wireless radio 102(2), a first maximum interference value 204, indicative of a signal strength or other metric value associated with the first wireless radio 102(1) that would avoid generating interference 104 in excess of a threshold quantity with regard to communications using the second wireless radio 102(2). In some implementations, the maximum interference value 204 may be determined using a table 208 or other data structure that associates signal strength values 206 with corresponding maximum interference values 204. Block 306(2) determines, based on the smallest signal strength value 206 for the third wireless radio 102(3), a second maximum interference value 204, indicative of a signal strength or other metric value associated with the first wireless radio 102(1) that would avoid generating interference 104 in excess of a threshold quantity with regard to communications using the third wireless radio 102(3).

Block 308(1) determines respective maximum transmission power 212 values for each antenna 110 of the first wireless radio 102(1) that may be used without generating interference 104 with the second wireless radio 102(2) that exceeds a threshold quantity of interference. The maximum transmission power 212 may be determined based on the isolation values 214 for each antenna 110 and the first maximum interference value 204. In some implementations, the maximum transmission power values 212 may also be determined using one or more offset values 216. For example, FIG. 2 depicts an example tolerance algorithm 218 that may be used to determine the maximum transmission power 212 based on the sum of an isolation value 214 and the maximum interference value 204, minus an offset value 216 that may compensate for fluctuations in signal strength associated with the first wireless radio 102(1). Block 308(2) determines respective maximum transmission power 212 values for each antenna 110 of the first wireless radio 102(1) that mitigate interference with the third wireless radio 102 (3).

Block 310 determines a smallest maximum transmission power 212 value for each antenna 110 of the first wireless radio 102(1). For example, if a maximum transmission power 212 for the first antenna 110(1) of the first wireless radio 102(1), determined at block 308(1), is less than a maximum transmission power 212 for the first antenna 110(1) determined at block 308(2), the maximum transmission power 212 determined at block 308(1) may be used as the maximum transmission power 212 value for the first antenna 110(1). Similarly, if the maximum transmission power 212 for the second antenna 110(2) of the first wireless radio 102(1), determined at block 308(1), is greater than a maximum transmission power 212 for the second antenna 110(2) determined at block 308(2), the maximum transmission power 212 determined at block 308(2) may be used as the maximum transmission power 212 value for the second antenna 110(2). Selection of the smallest maximum transmission power 212 value for each antenna 110 may mitigate interference 104 with each of the other wireless radios 102, while selection of a maximum transmission power 212 other than the smallest determined value may fail to mitigate the interference 104 for at least one of the wireless radios 102.

Block 312 determines, based on the maximum transmission power 212 and a current transmission power for the first wireless radio 102(1), a target change for the transmission power for each antenna 110 of the first wireless radio 102(1)

to at least partially mitigate interference 104 to other wireless radios 102. For example, Equation 3, above, illustrates that a target change in transmission power 222 for a particular antenna 110 may be determined based on the difference between a current transmission power and the maximum transmission power 212 for the antenna 110.

In other implementations, block 310 may be omitted, and block 312 may determine multiple target change values for the transmission power of each antenna 110 of the first wireless radio 102(1). The largest target change value for a particular antenna 110 may represent a change in the transmission power for the particular antenna 110, that will mitigate interference 104 to each of the other wireless radios 102.

Figure 4:
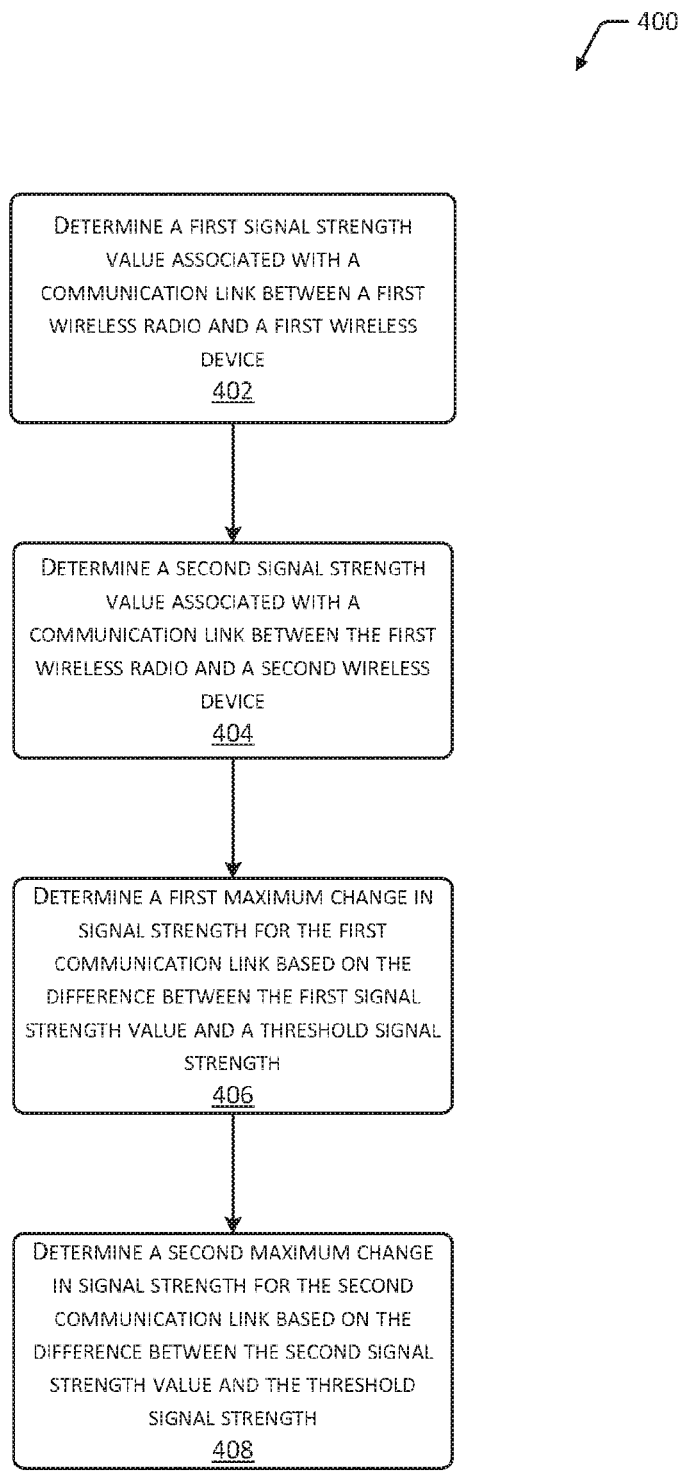
FIG. 4 is a flow diagram illustrating a method for determining a maximum change in transmission power for a first wireless radio that avoids reducing the quality of communications using the first wireless radio to a level less than a threshold quality.

FIG. 4 is a flow diagram 400 illustrating a method for determining a maximum change in signal strength 228 for each communication link 112 of a first wireless radio 102(1) that avoids reducing the quality of communications using the communication links 112 to a level less than a threshold quality. Block 402 determines a first signal strength value 206 associated with a communication link 112 between a first wireless radio 102(1) and a first wireless device 108(1). For example, a wireless radio 102 may communicate with an access point or other type of wireless device using a Wi-Fi® protocol, a Wi-Fi® direct protocol, and so forth. Each communication link 112 with a wireless device 108 may have an associated RSSI, RCPI, or other signal strength value 206. Block 404 determines a second signal strength value 206 associated with a communication link 112 between the first wireless radio 102(1) and a second wireless device 108(2). In some implementations, one or more of the first signal strength value 206 or the second signal strength value 206 may include an average signal strength value 206 determined for a particular time period or based on a fixed count of previous signal strength measurements.

Block 406 determines a first maximum change in signal strength 228 for the first communication link 112 based on the difference between the first signal strength value 206 and a threshold signal strength value 230. The threshold signal strength value 230 may represent a minimum signal strength for communications between the first wireless radio 102(1) and a wireless device 108 that prevents a degradation in the quality of the communications to a level below a threshold level of quality. The first maximum change in signal strength 228 may therefore represent an amount by which the signal strength of a communication using the first communication link 112 may decrease without reducing the quality of the communication below the threshold level.

Block 408 determines a second maximum change in signal strength for the second communication link 112 based on the difference between the second signal strength value 206 and the threshold signal strength value 230. In some implementations, a different threshold signal strength value 230 may be used for communications using the second communication link 112. For example, the first wireless radio 102(1) may communicate with one or more first wireless devices 108(1) using a first protocol, such as Wi-Fi®, and one or more second wireless devices 108(2) using a second protocol, such as Wi-Fi® Direct. Each protocol may have a respective average signal strength value 206 and a respective threshold signal strength value 230 indicative of a signal strength that prevents degradation of the quality of a communication below a threshold level of quality.

Figure 5:
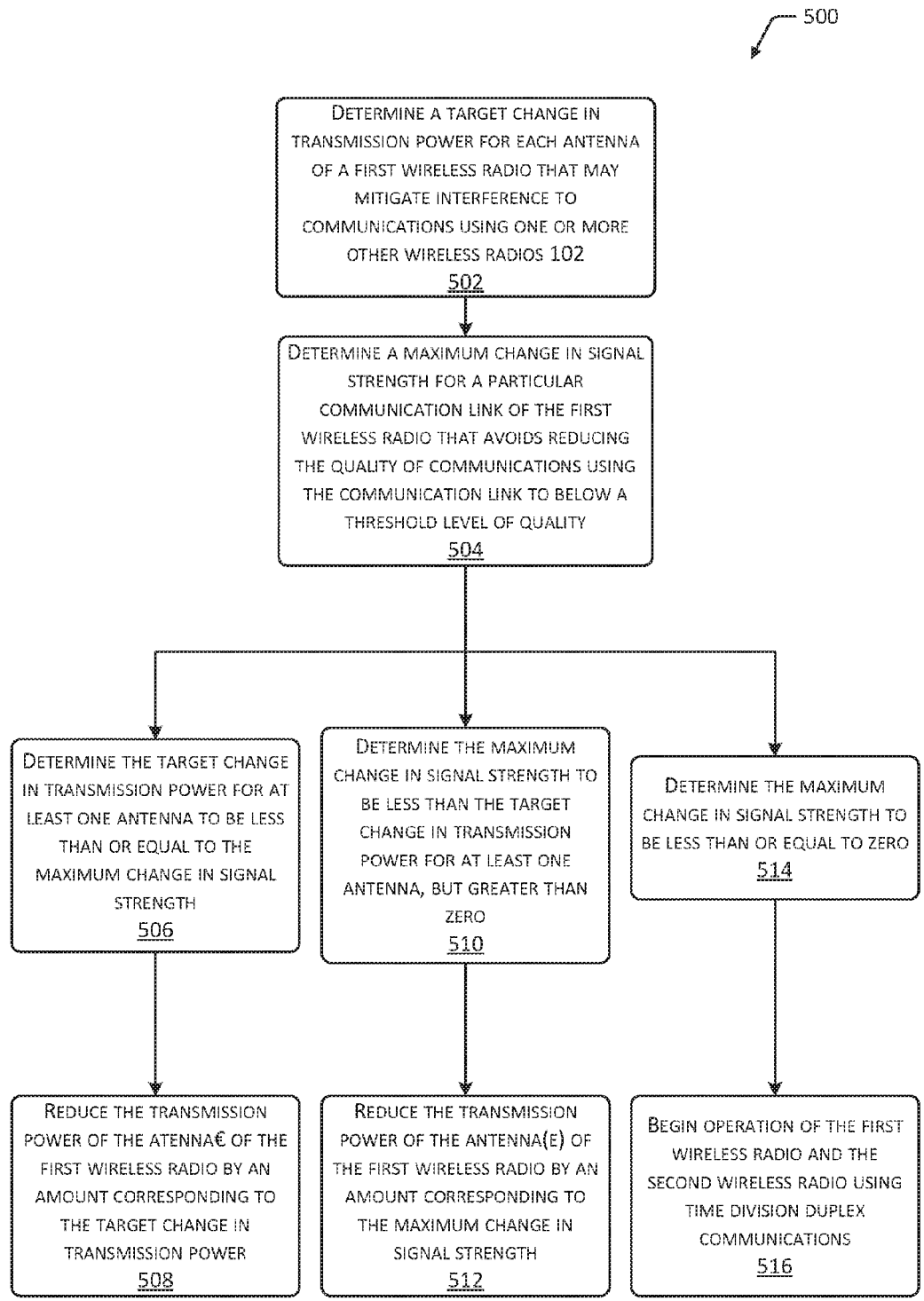
FIG. 5 is a flow diagram illustrating a method for determining a reduction in the transmission power of a first wireless radio based on a target change in transmission power to eliminate interference and a maximum change in transmission power to maintain communication quality.

FIG. 5 is a flow diagram 500 illustrating a method for determining a reduction in the transmission power of the antennae 110 of a first wireless radio 102(1) based on a target change in transmission power 222 to mitigate interference 104 and one or more values indicative of a maximum change in signal strength 228 to maintain communication quality. Block 502 determines a target change in transmission power 222 for each antenna 110 of a first wireless radio 102(1) that may mitigate interference 104 to communications using one or more other wireless radios 102. One example method by which a target change in transmission power 222 may be determined is illustrated in FIG. 3. Block 504 determines a maximum change in signal strength 228 for a particular communication link 112 of the first wireless radio 102(1) that avoids reducing the quality of communications using the communication link 112 to below a threshold level of quality. One example method by which a maximum change in signal strength 228 may be determined is illustrated in FIG. 4. Depending on the relationship between the target change in transmission power 222 for each antenna 110 and the maximum change in signal strength 228, the transmission power of the antennae 110 of the first wireless radio 102(1) may be modified in different manners. Additionally, depending on the particular communication link 112 that is currently being used by the first wireless radio 102(1), different values for the maximum change in signal strength 228 may be used. For example, a different target change in transmission power 222 may be determined for each antenna 110 of the first wireless radio 102(1), and a different maximum change in signal strength 228 may be determined for each communication link 112 maintained by the first wireless radio 102(1). As described with regard to FIGS. 1 and 2, a power configuration module 116 associated with a wireless communication device 106 may generate power configuration data 124 configured to modify the transmission power of each antenna 110 of the first wireless radio 102(1) based at least in part on the target change in transmission power 222 for each antenna 110 and the maximum change in signal strength 228 for the current communication link 112 used by the first wireless radio 102(1).

Block 506 may determine one or more of the target change in transmission power 222 values for the antennae 110 to be less than or equal to the maximum change in signal strength 228 for the current communication link 112 used by the first wireless radio 102(1). If a target change in transmission power 222 is less than the maximum change in signal strength 228, then the transmission power of the associated antenna 110 may be reduced by an amount based on the target change, thereby mitigating interference 104 on communications using the second wireless radio 102(2) and third wireless radio 102(3), without reducing the quality of communications using the first wireless radio 102(1) below a threshold quality. Thus, block 508 may reduce the transmission power of the first wireless radio 102(1) by an amount corresponding to the target change in transmission power 222.

Block 510 may determine that the maximum change in signal strength 228 is less than the target change in transmission power 222 for at least one antenna 110, but greater than zero. If the maximum change in signal strength 228 is less than the target change in transmission power 222, then the transmission power of the associated antenna 110 of the first wireless radio 102(1) may not be reduced by an amount based on the target change without reducing the quality of communications using the first wireless radio 102(1) below a threshold quality. However, reduction of the transmission power of the antenna 110 by an amount less than the target change in transmission power 222 may at least partially reduce the interference 104 caused by the first wireless radio 102(1). Therefore, block 512 may reduce the transmission power of at least one antenna 110 of the first wireless radio 102(1) by an amount corresponding to the maximum change in signal strength 228.

Block 514 may determine that the maximum change in signal strength 228 is less than or equal to zero. For example, independent of the interference 104 to the second wireless radio 102(2) and third wireless radio 102(3) caused by operation of the first wireless radio 102(1), the signal strength achieved by the first wireless radio 102(1) may be insufficient to maintain a threshold level of quality. Continuing the example, the first wireless radio 102(1) may be transmitting or receiving a type of content that utilizes a large quantity of airtime or other network or computational resources, or the communication channel used by the first wireless radio 102(1) may be congested, affected by noise, and so forth. Under such circumstances, reduction of the transmission power of the first wireless radio 102(1) would further reduce the quality of communications using the first wireless radio 102(1).

As such, block 516 may begin operation of the first wireless radio 102(1), second wireless radio 102(2), and third wireless radio 102(3) using time division duplex communications rather than full duplex (e.g., simultaneous) communications. By using the wireless radios 102 in an alternate manner, interference 104 caused by operation of one wireless radio 102 on communications using another wireless radio 102 may be eliminated, and resources consumed by operation of one wireless radio 102 may not be consumed during times when another wireless radio 102 is being operated.

In another implementation, rather than operating the wireless radios 102 using time division duplex communications, simultaneous operation of the wireless radios 102 may be continued, but without reducing the transmission power of the first wireless radio 102(1). In yet another implementation, the transmission power of the first wireless radio 102(1) may be decreased regardless of the effect on the quality of communications using the first wireless radio 102(1), to reduce interference 104 on communications using the other wireless radios 102. In still another implementation, the transmission power of the first wireless radio 102(1) may be increased regardless of the effect on the quality of communications using the other wireless radio 102, to increase the quality of communications using the first wireless radio 102(1). The prioritizing of communications using a particular wireless radio 102 may be determined based on one or more user settings or preferences, or one or more default settings. In other implementations, certain types of content may be prioritized over other types of content, or content may be prioritized based on the computing resources used to transmit the content.

Figure 6:
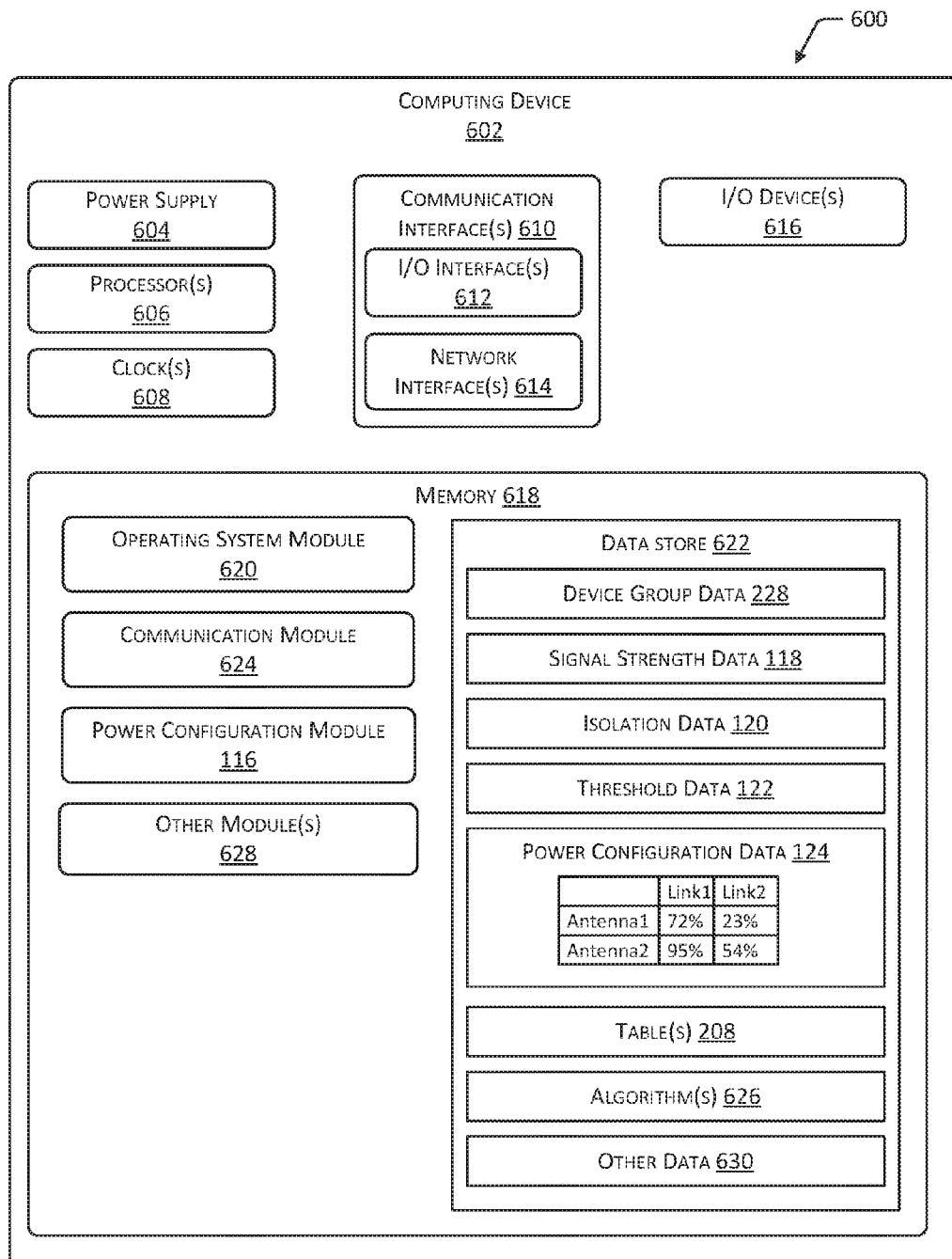
FIG. 6 is a block diagram illustrating a computing device within the scope of the present disclosure.

FIG. 6 is a block diagram 600 illustrating a computing device 602 within the scope of the present disclosure. The computing device 602 may include a wireless communication device 106, as shown in FIG. 1. In other implementations, one or more of the functions described with regard to the computing device 602 may be performed by one or more wireless devices 108, servers 114, and so forth. Any number and any combination of one or multiple types of computing devices 602 may be used to perform any of the functions described herein, such as by using a distributed network of computing devices 602.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth.

The computing device 602 may include one or more communication interface(s) 610, such as input/output (I/O) interface(s) 612, network interface(s) 614, and so forth. The communication interfaces 610 may enable the computing device 602, or components of the computing device 602, to communicate with other computing devices 602 or components thereof, such as by use of one or more wireless radios 102. The I/O interface(s) 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O device(s) 616. The I/O devices 616 may include any manner of input device or output device associated with the computing device 602 or with another computing device 602 in communication therewith. For example, I/O devices 616 may include touch sensors, keyboards, mouse devices, microphones, image sensors (e.g., cameras), scanners, displays, speakers, haptic devices, printers, motion sensors, location sensors, and so forth. In some implementations, the I/O device(s) 616 may be physically incorporated with a computing device 602 or may be externally placed.

The network interface(s) 614 may be configured to provide communications between the computing device 602 and other devices, such as the I/O devices 616, routers, access points, wireless devices 108, and so forth. The network interface(s) 614 may include devices configured to couple to one or more networks, including local area networks (LANs), wireless LANs, wide area networks (WANs), wireless WANs, and so forth. For example, the network interfaces 614 may include computing devices 602 compatible with Ethernet, Wi-Fi®, Wi-Fi Direct®, Bluetooth®, Bluetooth® Low Energy, ZigBee®, Z-Wave®, 3G, 4G, LTE, and so forth.

The computing device 602 may include one or more busses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD™ operating system as promulgated by the FreeBSD® Project; UNIX® or a UNIX-like operating system; a variation of the Linux™ operating system as promulgated by Linus Torvalds; the Windows® operating system from Microsoft Corporation of Redmond, Wash., USA; or other operating systems.

A data store 622 and one or more of the following modules may also be stored in the memory 618. The modules may be executed as foreground applications, background tasks, daemons, and so forth. The data store 622 may use a flat file, database, linked list, tree, executable code, script, or other data structure to store information. In some implementations, the data store 622 or a portion of the data store 622 may be distributed across one or more other devices including other computing devices 602, network attached storage devices, and so forth.

A communication module 624 stored in the memory 618 may be configured to establish communications with wireless devices 108, or other computing devices 602, such as by using one or more wireless radios 102.

The memory 618 may also store the power configuration module 116, discussed previously with regard to FIGS. 1 and 2. The power configuration module 116 may determine signal strength data 118 associated with communications between wireless radios 102 and one or more wireless devices 108. Based on the signal strength data 118 for a particular wireless radio 102 (e.g., a non-aggressor wireless radio 102) and a table 208 or other data structure, a maximum interference value 204 for another wireless radio 102 (e.g., an aggressor wireless radio 102) that may interfere with the particular wireless radio 102 may be determined. Based on the maximum interference value 204 and isolation data 120 associated with antenna(e) 110 used by the aggressor wireless radio 102, maximum transmission power 212 values for each antenna 110 of the aggressor wireless radio 102 may be determined. The maximum transmission power 212 may represent a power for a particular antenna 110 that avoids generating interference 104 with communications using the non-aggressor wireless radio 102 that would exceed a threshold level of interference 104. Based on the maximum transmission power 212, signal strength data 118 associated with communications using the aggressor wireless radio 102, a current transmission power of the antennae 110 of the aggressor wireless radio 102, and threshold data 122, a target change in transmission power 222 for each antenna 110 and a maximum change in signal strength 228 for each communication link 112 of the aggressor wireless radio 102 may be determined. Based on these values, the power configuration module 116 may generate power configuration data 124 to modify the transmission power of the aggressor wireless radio 102. To determine one or more of the maximum interference value 204, maximum transmission power 212, target change in transmission power 222, maximum change in signal strength 228, or power configuration data 124, the power configuration module 116 may access one or more algorithms 626. The algorithms 626 may include, for example, one or more tolerance algorithms 218, target change algorithms 224, maximum change algorithms 232, configuration algorithms 236, and so forth, as described with regard to FIG. 2.

The power configuration data 124 may cause the transmission power of one or more antennae 110 of the aggressor wireless radio 102 to be modified differently. Additionally, the power configuration data 124 may cause the transmission power of the aggressor wireless radio 102 to be modified differently for different communication links 112 that are used to transmit data by the aggressor wireless radio 102. For example, the power configuration data 124 may take the form of a table or matrix that indicates a particular transmission power or a particular modification to the transmission power of the aggressor wireless radio 102 for each combination of antenna 110 and communication link 112 usable by the aggressor wireless radio 102. In some implementations, the transmission power indicated in the power configuration data 124 may be expressed as a percentage of a maximum transmission power or a selected transmission power associated with the antennae 110 of the aggressor wireless radio 102. In other implementations, the power configuration data 124 may be expressed as absolute values or magnitudes of changes in transmission power. Continuing the example, FIG. 6 depicts the power configuration data 126 for a wireless radio 102 that includes two antennae 110 and maintains two communication links 112 with different wireless devices 108. The depicted power configuration data 126 indicates different transmission power values for each combination of antenna 110 and communication link 112 that may be used by the aggressor wireless radio 102.

Other modules 628 may also be present in the memory 618. For example, encryption modules may be used to encrypt and decrypt communications between computing devices 602. User interface modules may be configured to receive and modify user settings, configurations, and preferences, default settings, threshold data 122, and so forth. For example, a user configuration may indicate whether to prioritize communication quality associated with a first wireless radio 102(1) or that of a second wireless radio 102(2).

Other data 630 within the data store 622 may include default configurations and settings associated with computing devices 602. Other data 630 may also include security data, such as encryption keys and schema, access credentials, and so forth.

In different implementations, different computing devices 602 may have different capabilities or capacities. For example, servers 114 used to provide content to user devices may have significantly more processor 606 capability and memory 618 capacity compared to the processor 606 capability and memory 618 capacity of wireless devices 108.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a first wireless radio configured to use a first wireless protocol, wherein the first wireless radio includes a first antenna and a second antenna;
a second wireless radio configured to use a second wireless protocol, wherein the second wireless radio includes a third antenna;
one or more memories storing computer-executable instructions; and
one or more hardware processors to execute the computer-executable instructions to:
 access isolation data indicating a first isolation value (IV1) and a second isolation value (IV2), wherein the first isolation value corresponds to a first quantity of physical isolation between the first antenna and the third antenna and the second isolation value corresponds to a second quantity of physical isolation between the second antenna and the third antenna;
 determine a first signal strength value (SSV1) associated with communication using the second wireless radio;
 determine, based on the first signal strength value, a maximum interference value (MIV) indicative of a maximum signal strength of communications using the first wireless radio that that does not interfere with communication using the second wireless radio;
 determine a first maximum transmission power (MTP1) for the first antenna, based at least in part on the equation: MTP1=MIV+IV1;
 determine a second maximum transmission power (MTP2) for the second antenna, based at least in part on the equation: MTP2=MIV+IV2;
 determine a first target change in transmission power (TCTP1) of the first antenna based at least in part on a first current transmission power (TP1) of the first antenna and the equation TCTP1=TP1−MTP1;
 determine a second target change in transmission power (TCTP2) of the second antenna based at least in part on a second current transmission power (TP2) of the first wireless radio and the equation TCTP2=TP2−MTP2;
 determine a second signal strength value (SSV2) associated with communication by the first wireless radio using a first communication link;
 determine a first threshold signal strength value (TSSV1) indicative of a minimum signal strength of the first wireless radio that may be used without decreasing quality of communications using the first communication link below a threshold level of quality;
 determine a first maximum change in signal strength (MCSS1) for the first communication link based at least in part on the equation: MCSS1=SSV2−TSSV1;
 determine a third signal strength value (SSV3) associated with communication by the first wireless radio using the second communication link;
 determine a second threshold signal strength value (TSSV2) indicative of a minimum signal strength of the first wireless radio that may be used without decreasing quality of communications using a second communication link below the threshold level of quality;
 determine a second maximum change in signal strength (MCSS2) for the second communication link based at least in part on the equation: MCSS2=SSV3−TSSV2;
 determine that the first wireless radio is transmitting data using the first communication link;
 determine that the first target change in transmission power is less than or equal to the first maximum change in signal strength;
 decrease the first current transmission power by a value equal to the first target change in transmission power;
 determine that the second target change in transmission power is less than or equal to the second maximum change in signal strength; and
 decrease the second current transmission power by a value equal to the second target change in transmission power.

2. The system of claim 1, further comprising a third wireless radio, the system further comprising computer-executable instructions to:
determine a fourth signal strength value associated with communication using the third wireless radio; and
determine that the fourth signal strength value is greater than the first signal strength value;
wherein the maximum interference value is determined based on the first signal strength value being less than the fourth signal strength value.

3. The system of claim 1, wherein the second wireless radio communicates using a third communication link and a fourth communication link, the system further comprising computer-executable instructions to:

determine the first signal strength value associated with communication using the third communication link;

determine a fourth signal strength value associated with communication using the fourth communication link; and determine that the first signal strength value is less than the fourth signal strength value;

wherein the maximum interference value is determined based on the first signal strength value being less than the fourth signal strength value.

4. The system of claim 1, further comprising computer-executable instructions to:

determine a first data throughput value associated with the first communication link;

determine a second data throughput value associated with the second communication link;

access threshold data that associates threshold signal strength values with corresponding data throughput values;

determine the first threshold signal strength value corresponds to the first data throughput value; and determine the second threshold signal strength value corresponds to the second data throughput value.

5. A method comprising:

determining a first isolation value associated with a first antenna of a first wireless radio;

determining a second isolation value associated with a second antenna of the first wireless radio;

determining a first signal strength value associated with communication using a second wireless radio;

determining, based at least in part on the first signal strength value and the first isolation value, a first maximum transmission power of the first antenna;

determining, based at least in part on the first signal strength value and the second isolation value, a second maximum transmission power of the second antenna;

determining a first current transmission power of the first antenna;

determining a first target change in transmission power of the first antenna based at least in part on the first current transmission power and the first maximum transmission power;

determining a second current transmission power of the second antenna;

determining a second target change in transmission power of the second antenna based at least in part on the second current transmission power and the second maximum transmission power;

determining a first maximum change in signal strength of the first wireless radio that may be made without reducing quality of communication using the first wireless radio below a threshold quality;

based on one or more of the first target change in transmission power or the first maximum change in signal strength, modifying the first current transmission power; and based on one or more of the second target change in transmission power or the second maximum change in signal strength, modifying the second current transmission power.

6. The method of claim 5, further comprising:

accessing a data structure, the data structure including information associating each value of a plurality of signal strength values with a respective maximum interference value of the second wireless radio, wherein the respective maximum interference value is indicative of a maximum signal strength of communications using the first wireless radio that that does not interfere with communication using the second wireless radio; and determining, based on the data structure, a first maximum interference value that corresponds to the first signal strength value, wherein the first maximum transmission power is determined based on the first maximum interference value and the first isolation value and the second maximum transmission power is determined based on the first maximum interference value and the second isolation value.

7. The method of claim 6, wherein the first maximum transmission power is determined based at least in part on a first sum of the first maximum interference value and the first isolation value, and the second maximum transmission power is determined based at least in part on a second sum of the first maximum interference value and the second isolation value.

8. The method of claim 5, wherein the first wireless radio communicates using a first communication link and a second communication link, the method further comprising:

determining a second signal strength value associated with communication by the first wireless radio using the first communication link;

determining the first maximum change in signal strength based on a difference between the second signal strength value and a threshold signal strength value, wherein the first maximum change in signal strength is associated with the first communication link;

determining a third signal strength value associated with communication by the first wireless radio using the second communication link; and determining a second maximum change in signal strength based on a difference between the second signal strength value and the threshold signal strength value, wherein the first maximum change in signal strength is associated with the second communication link.

9. The method of claim 8, further comprising:

determining that the first wireless radio has begun transmitting data using the second communication link;

based on the first target change in transmission power and the second maximum change in signal strength, modifying the first current transmission power; and based on the second target change in transmission power and the second maximum change in signal strength, modifying the second current transmission power.

10. The method of claim 5, wherein the second wireless radio communicates using a first communication link and a second communication link, the method further comprising:

determining the first signal strength value associated with communication using the first communication link; and determining a second signal strength value associated with communication using the second communication link;

wherein the first signal strength value for the second wireless radio is the lesser of the first signal strength and the second signal strength.

11. The method of claim 5, further comprising:

determining a first transmission power modification value based on a lesser of the first target change in transmission power and the first maximum change in signal strength;

wherein modifying the first current transmission power of the first antenna includes reducing the first current transmission power by the first transmission power modification value; and determining a second transmission power modification value based on a lesser of the second target change in transmission power and the second maximum change in signal strength;

wherein modifying the second current transmission power of the second antenna includes reducing the second current transmission power by the second power modification value.

12. The method of claim 5, further comprising:

determining that the first maximum change in signal strength is less than the first target change in transmission power by at least a threshold quantity; and switching operation of the first wireless radio and the second wireless radio from simultaneous use of the first wireless radio and the second wireless radio to alternating use of the first wireless radio and the second wireless radio.

13. The method of claim 5, further comprising:

determining a second signal strength value associated with communication using a third wireless radio;

determining, based at least in part on the second signal strength value and the first isolation value, a third maximum transmission power of the first antenna that may be used without interfering with communication using the third wireless radio;

determining the first maximum transmission power to be less than the third maximum transmission power;

determining, based at least in part on the second signal strength value and the second isolation value, a fourth maximum transmission power of the second antenna that may be used without interfering with communication using the third wireless radio; and determining the second maximum transmission power to be less than the fourth maximum transmission power.

14. A system comprising:

a first wireless radio having a first antenna, wherein the first wireless radio communicates using a first communication link and a second communication link;

a second wireless radio;

one or more memories storing computer-executable instructions; and one or more hardware processors to execute the computer-executable instructions to:

determine a first isolation value between the first antenna and the second wireless radio;

determine a first signal strength value associated with communication using the second wireless radio;

determine, based at least in part on the first isolation value and the first signal strength value, a first maximum transmission power of the first antenna that may be used without generating a threshold quantity of interference to communications using the second wireless radio;

determine a second signal strength value associated with communication of the first wireless radio using the first communication link;

determine a third signal strength value associated with communication of the first wireless radio using the second communication link;

determine a first maximum change in signal strength for the first communication link based at least in part on the second signal strength value and threshold data indicative of a first minimum signal strength of the first wireless radio that may be used without decreasing communication using the first communication link below a threshold quality;

determine a second maximum change in signal strength for the second communication link based at least in part on the third signal strength value and the threshold data, wherein the threshold data is further indicative of a second minimum signal strength of the first wireless radio that may be used without decreasing communication using the second communication link below the threshold quality;

determine that the first wireless radio is transmitting data using the first communication link;

modify a first current transmission power of the first antenna to a second transmission power based at least in part on the first maximum change in signal strength and the first maximum transmission power.

15. The system of claim 14, wherein the first wireless radio is further associated with a second antenna, the system further comprising computer-executable instructions to:

determine a second isolation value between the second antenna and the second wireless radio;

determine, based at least in part on the second isolation value and the first signal strength value, a second maximum transmission power of the second antenna that may be used without generating the threshold quantity of interference to communications using the second wireless radio; and modify a second current transmission power of the second antenna to a third transmission power based at least in part on the first maximum change in signal strength and the second maximum transmission power.

16. The system of claim 14, further comprising computer-executable instructions to:

determine a fourth signal strength value associated with communication using the second wireless radio;

determine, based on the fourth signal strength value, a maximum interference value of the first wireless radio; and wherein the first maximum transmission power is determined based on the maximum interference value and the first isolation value.

17. The system of claim 14, further comprising a third wireless radio and computer-executable instructions to:

determine a fourth signal strength value associated with communication using the second wireless radio;

determine, based on the fourth signal strength value, a first maximum interference value of the first wireless radio;

determine a fifth signal strength value associated with communication using the third wireless radio;

determine, based on the fifth signal strength value, a second maximum interference value of the first wireless radio;

wherein the first maximum transmission power is determined based on the lesser of:

a first sum of the first maximum interference value and the first isolation value; and a second sum of the second maximum interference value and the first isolation value.

18. The system of claim 14, wherein the second wireless radio communicates using at least a third communication link and a fourth communication link, the system further comprising computer-executable instructions to:

determine the first signal strength value by determining a lesser of a first signal strength associated with communication using the first communication link and a second signal strength associated with communication using the second communication link.

19. The system of claim 14, further comprising computer-executable instructions to:
  determine that the first wireless radio has begun transmitting data using the second communication link; and
  modify the second transmission power to a third transmission power based at least in part on the second maximum change in signal strength and the first maximum transmission power.

20. The system of claim 14, further comprising computer-executable instructions to:
  determine a first data throughput value associated with communication using the first communication link;
  determine a second data throughput value associated with communication using the second communication link;
  determine the first threshold signal strength value based on the first data throughput value and threshold data that associates threshold signal strength values with data throughput values; and
  determine the second threshold signal strength value based on the second data throughput value and the threshold data.

\* \* \* \* \*